Sept. 21, 1965     J. M. YOST     3,207,826

METHOD FOR MAKING THERMOPLASTIC SEALS

Filed Aug. 24, 1962     3 Sheets-Sheet 1

INVENTOR.
James M. Yost

BY Webb Mackey & Burden
HIS ATTORNEYS

Sept. 21, 1965   J. M. YOST   3,207,826
METHOD FOR MAKING THERMOPLASTIC SEALS
Filed Aug. 24, 1962   3 Sheets-Sheet 2
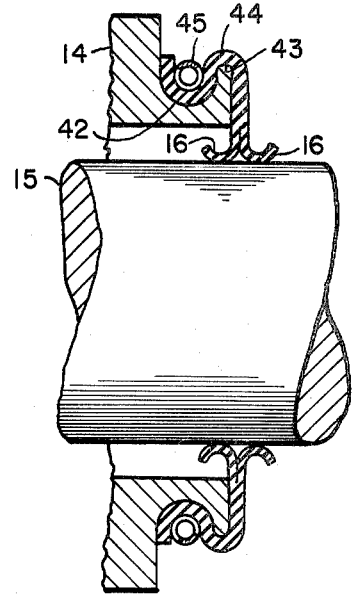
Fig.6
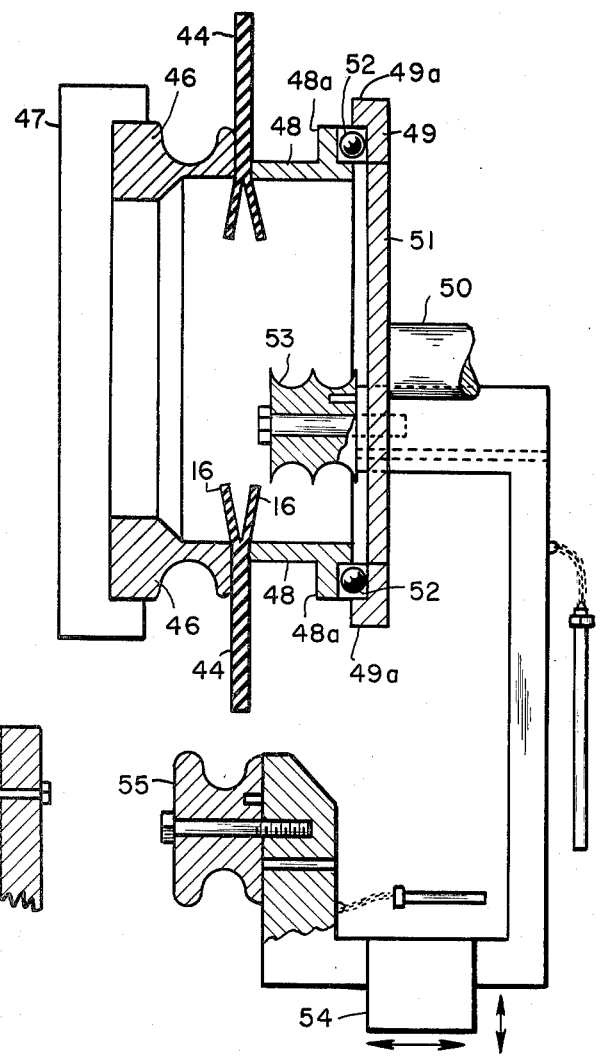
Fig.7
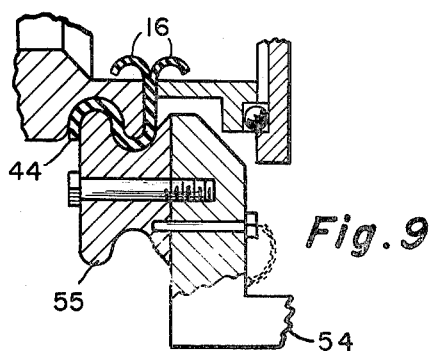
Fig.8
Fig.9
INVENTOR.
James M. Yost
BY
Watt Mackey + Burden
HIS ATTORNEYS Sept. 21, 1965 J. M. YOST 3,207,826
METHOD FOR MAKING THERMOPLASTIC SEALS
Filed Aug. 24, 1962 3 Sheets-Sheet 3

INVENTOR.
James M. Yost
BY
Webb Mackey + Burden
HIS ATTORNEYS

United States Patent Office 3,207,826
Patented Sept. 21, 1965

3,207,826
METHOD FOR MAKING THERMOPLASTIC SEALS
James M. Yost, Sewickley Heights, Pa., assignor to Allegheny Plastics, Inc.
Filed Aug. 24, 1962, Ser. No. 219,298
2 Claims. (Cl. 264—159)

This application relates to method for making thermoplastic seals, more particularly thermoplastic seals which are relatively thin and especially seals made of the thermoplastic material known as polytetrafluoroethylene.

My method can be used for making seals of thermoplastic material which can be injection molded and is useful in making such seals in quantities which are not sufficient to justify the expense of dies required for injection molding. My invention is particularly useful, however, in making seals of polytetrafluoroethylene which is manufactured and sold under the trademark "Teflon."

As is known, Teflon has remarkable dielectric and heat resistant properties and is chemically inert and therefore it is especially suited for the manufacture of seals which are subjected to high temperatures and corrosive chemicals. It is equally noted, however, for difficulties encountered in forming it into desired shapes. If products having thin sections (i.e., less than 0.10″ to about 0.15″ in thickness) are formed by conventional pressure molding applied to Teflon powder, so called "low spots" or other irregularities result due to non-uniform powder distribution which produces weakened area in the walls of finished articles. Also, Teflon, although classed as a resinous thermoplastic material, does not melt and flow as do conventional thermoplastics. When heated above its "gel" temperature (620° F.), Teflon transforms from a normal state to an amorphous gel which is capable only of a very limited amount of flow even though the temperature of the gel is maintained.

My invention avoids these difficulties which are encountered in conventional forming techniques.

In the accompanying drawings, I have illustrated certain presently preferred embodiments of my invention in which:

FIGURE 1 is a vertical section through a shaft and mounting for the shaft in which a bearing seal manufactured in accordance with my invention is installed;

FIGURES 2 to 5, inclusive, are fragmentary plan views partially in section of apparatus for forming the seal shown in FIGURE 1;

FIGURE 6 is a partial vertical section similar to FIGURE 1 showing another form of seal;

FIGURES 7 to 9, inclusive, are fragmentary plan views partially in section showing apparatus for forming the seal shown in FIGURE 6;

Figure 1:
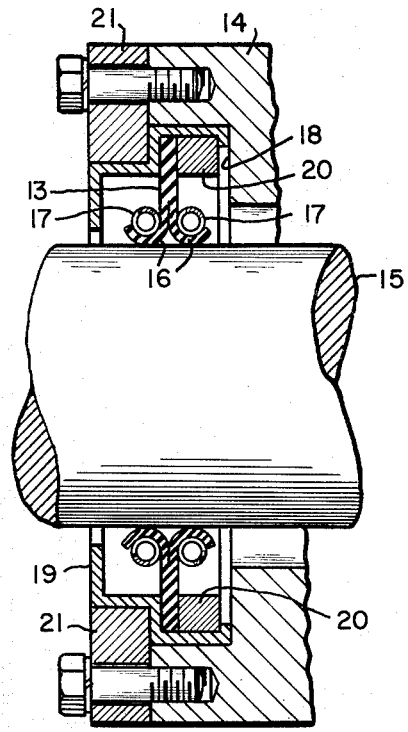
Figure 2:
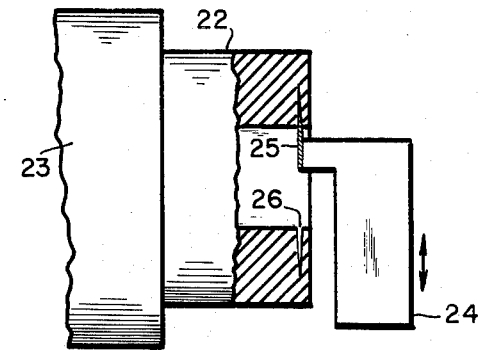
Figure 3:
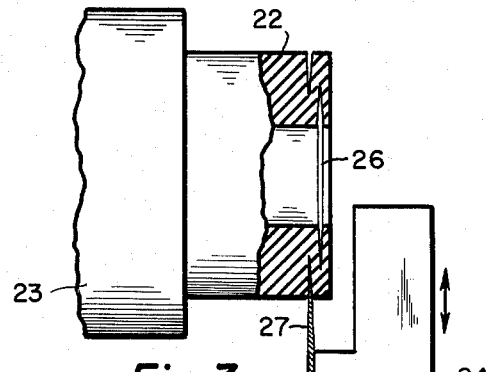

Referring to FIGURE 1, a seal 13 is used to close the space between a housing 14 and a shaft 15 rotating in that housing. The shaft is supported in conventional anti-friction bearings which are not shown, it being the purpose of the seal to act as an oil seal and prevent the escape of oil and grease out of the bearings between the housing 14 and shaft 15.

The seal 13 comprises a flat ring of thermoplastic material having a central opening through which the shaft 15 extends. The portion of the ring adjacent the inner periphery of the seal is slit and the two portions resulting from this slit are curved outwardly away from each other to form lips 16 which engage the surface of the shaft 15. Garter springs 17 hold the lips 16 against the shaft 15. A recess 18 is formed in the end of the housing 14, and the outer periphery of the seal 13 is held in this recess by a cylindrical casing 19 which clamps the seal between it and a retaining ring 20. An outer ring 21 bolted to the housing 14 holds the cylindrical casing in the recess 18.

The distance between the outer periphery of the recess 18 and the surface of the shaft is less than the distance between the inner and outer peripheries of the seal 13 so that the curved lips 16 exert a pressure against the surface of the shaft which pressure is increased by the garter springs 17.

Teflon can be lengthened about ten (10%) percent without permanent deformation, and it has a coefficient of thermal expansion about ten times that of steel. The lips 16 overcome these defects because they are thin enough to be flexible, and can be bent without permanent deformation and can therefore accommodate changes due to thermal expansion and contraction of the shaft and housing.

FIGURES 2 to 5, inclusive, show apparatus for manufacturing the seal 13 of FIGURE 1. A hollow cylinder 22 of thermoplastic material is mounted in a conventional lathe chuck 23. The outer diameter of the cylinder 22 is the same as the outer periphery of the seal 13 and the inner diameter of the cylinder is the same as the central opening of the seal 13 before the lips 16 have been formed. A cross slide 24 on the lathe having the chuck 23 carries a knife 25 which can be inserted into the hollow center of the cylinder 22 and moved against the inner surface of the cylinder 22 by moving the cross slide.

The lathe is started to rotate chuck 23 and the cylinder 22 and the cross slide is moved first into the central opening of the cylinder 22 and then outwardly against the inner surface of the cylinder to form a slit 26. The slit is formed a distance from the end of the cylinder which is equal to the thickness of the lips 16 of the seal 13 and the slit 26 is cut into the cylinder 22 a distance equal to the length of the lips. A second knife 27 also mounted on the cross slide 24 is then brought inwardly against the outer cylindrical surface of the cylinder 22 to cut off the end of the cylinder. The knife is positioned from the end of the cylinder a distance equal to the thickness of the outer periphery of the seal 13. The above two operations form a flat ring of thermoplastic material having a central slit which extends outwardly from the inner periphery of the ring and in a plane parallel to the planes of the sides of the ring.

Figure 4:
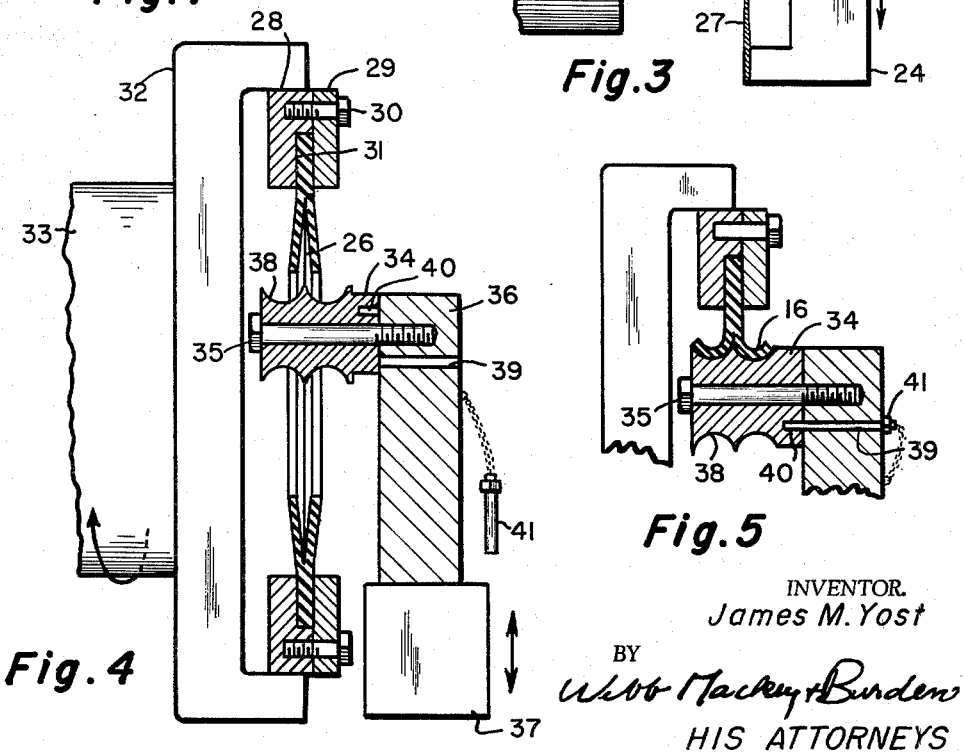
Figure 5:
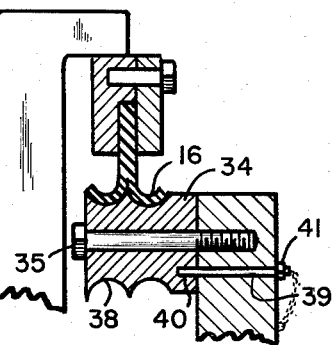

The outer periphery of the ring which has been cut off from the cylinder 22 is then mounted in a circular clamp made up of two rings 28 and 29 which are held together by bolts 30 and one of which has recess 31 into which the outer periphery of the thermoplastic ring can be clamped (see FIGURE 4). The two rings 28 and 29 bolted together are then mounted in jaws 32 of a lathe chuck 33 and rotated. A forming tool 34 held by a bolt 35 to an extension 36 of a cross slide 37 of the lathe having the chuck 33 is placed within the central aperture of the thermoplastic ring and moved against the inner periphery of the split thermoplastic ring by moving the cross slide. As shown in FIGURE 4, the forming tool 34 is generally cylindrical and has an outer contoured surface 38 which has the shape of the lips 16 of the seal 13 after they have been curved. The surface 38 is in the form of two semi-circular grooves and when the forming tool is moved against the inner periphery of the thermoplastic ring, the point where the two grooves join is in line with the slit 26 which has previously been formed in the ring. The forming tool 34 is moved against the inner periphery of the thermoplastic ring until the portions of the ring on either side of the slit 26 have been curved to the desired extent as shown in FIGURE 5.

I have found that when a forming tool is first placed against relatively thin sections of thermoplastic material, the surface of the tool should rotate with the material being formed. Therefore, the bolt 35 is adjusted so that the forming tool 34 can rotate about the bolt. In later stages of the forming operation, the forming tool is preferably stationary. Therefore, I provide a bore 39 in the extension 36 and a bore 40 in the forming tool 34 which can be brought into line with the bore 39 by turning the tool. A pin 41 is then inserted into both the bores 39 and 40 as shown in FIGURE 5 to prevent rotation of the forming tool.

FIGURE 6 shows a seal generally similar to that shown in FIGURE 1 which can also be made in accordance with my invention. The seal of FIGURE 6 differs from that shown in FIGURE 1 in that garter springs 17 are not mounted on the curved lips of the seal which engage the shaft. An inwardly extending recess 42 is formed adjacent the outer end of the housing 14, thus forming a shoulder 43 at the end of the housing. The portion 44 of the seal which extends inwardly from its outer edge is bent around the shoulder 43 and into the recess 42 and held in that recess by a garter spring 45. Such a seal may be used when it is necessary to omit the garter springs 17 of FIGURE 1 in order to reduce the pressure exerted by the lips 16 against the shaft and thereby avoid excessive heat build-up.

FIGURES 7 to 9, inclusive, show apparatus for making the seal shown in FIGURE 6. A flat ring of thermoplastic material is slit and cut off a hollow cylinder of thermoplastic material in the same manner as described with reference to FIGURES 2 and 3. The flat ring is then mounted on the chuck of a lathe by means of apparatus shown in FIGURE 7. A ring 46 is clamped in the jaws 47 of a chuck, and a second cylindrical ring 48 is supported in a support ring 49 which is mounted in the tail stock of the lathe having the chuck 47. For this purpose a tool holder 50 is mounted on the tail stock and this tool holder has a bar 51 which extends across one diameter of the ring 49 to support the ring. The cylinder 48 rotates on the support ring 49, within an axially extending flange 49a, roller bearings 52 held between the flange 49a and a radially extending flange 48a on the ring 48 being provided for this purpose. The flat ring of thermoplastic material is clamped between the two rings 46 and 48 by moving the tail stock towards the chuck of the lathe. A forming tool 53 mounted on a cross slide 54 is then moved against the portions of the thermoplastic ring on either side of the slit to form lips 16 in the same manner as was described with reference to FIGURES 4 and 5, FIGURE 8 showing the final forming stage.

The portion 44 of the seal is then curved so that it will conform to the recess 42 and shoulder 43 of the housing 14. This is done by a second forming tool 55 also mounted on the cross slide 54. As appears in FIGURE 7, the outer surface of the ring 46 is shaped to conform to the shape of the recess 42 and shoulder 43 of the housing 14 and the surface of the forming tool 55 is shaped to conform to the outer side of the portion 44 of the thermoplastic ring when it is mounted on the housing 14. The cross slide 54 is then moved to bring the forming tool 55 against the outer periphery of the flat plastic ring as shown in FIGURE 9 to thereby shape the outer portion of the plastic ring to the form of the portion 44 when the seal is mounted on the housing 14.

Figure 10:
FIGURE 10 is a vertical central section of a spring seal, part of which is made in accordance with this present invention.

FIGURE 10 shows a spring seal which I have invented and which is described and claimed in my copending application Serial No. 219,299 filed August 24, 1962. The seal comprises a garter spring 56 which is covered by a sheath 57 of thermoplastic material. Preferably the material is Teflon so that the advantages of Teflon for use as a seal can be obtained, i.e., resistance to high temperatures, chemical inertness, etc., and the garter spring can supply the resilience which Teflon lacks. As appears in FIGURE 10, the sheath 57 extends approximately 240° around the garter spring 56.

Figure 11:
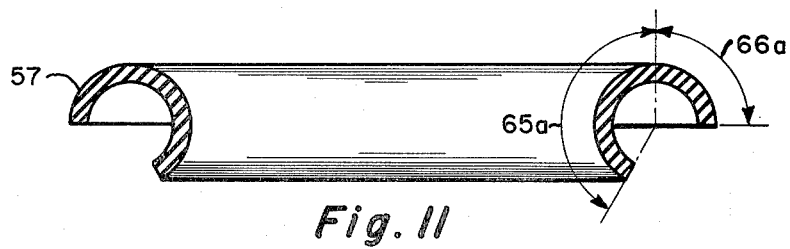
FIGURE 11 shows the part of the seal shown in FIGURE 10 which is made by my invention.

FIGURE 11 shows the sheath 57 which may be manufactured in accordance with my present invention.

Figure 12:
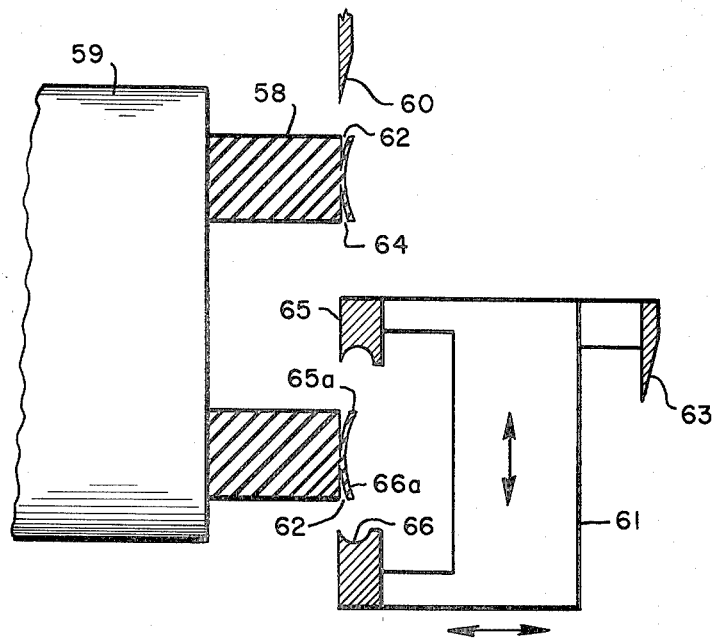
FIGURE 12 is a fragmentary plan view partially in section showing apparatus for manufacturing the part shown in FIGURE 11.

FIGURE 12 shows diagramatically apparatus for making the sheath 57. A hollow cylinder 58 of thermoplastic material is mounted in a chuck 59 of a lathe and rotated. A knife 60 mounted on a cross slide 61 of the lathe having the chuck 59 is moved inwardly against the outer cylindrical surface of the rotating cylinder 58 to form slit 62. A second knife 63 also mounted on the cross slide 61 is moved outwardly against the inner surface of the cylinder 58 to form a slit 64. (For the purpose of making the slit 64, the cross slide 61 is turned 180° so as to bring the knife 63 in line with the knife 60.) As shown in FIGURE 12, the two slits are in the same plane, are parallel to the end of the cylinder and have such depth as to leave a narrow flat annulus on the end of the cylinder. They are spaced from the end of the cylinder a distance equal to the thickness of the seal.

The piece is not cut off of the end of the cylinder while the slits are being made so as to give support to the piece during a forming operation which follows the slitting. The cross slide 61 carries two opposed forming tools 65 and 66 which engage the inner and outer portions 65a and 66a respectively of the cylinder which are between the slits 62 and 64 and the end of the cylinder. The cross slide is moved alternately to bring first one and then the other of the two forming tools 65 and 66 against the portions 65a and 66a so as to curve them into the shape shown in FIGURE 11.

In FIGURE 11, the portions of the finished sheath 57 which are formed by the two curved portions 65a and 66a are indicated. It will be noted that the portion 65a forms 150° of the circumference of the sheath and the portion 66a forms only 90°. The reason for this difference is that when the tool 66 is moved inwardly against the portion 66a of the seal and curves the seal, the end of the portion 66a turns about a continuously decreasing radius and I have found that after the portion 66a has been curved through an arc of 90°, the inner surface of this portion wrinkles. On the other hand, when the forming tool 65 is moved radially outward against the portion 65a the end of that portion turns about a constantly increasing radius with the result that there is no wrinkling on its inner surface.

From the foregoing, it is apparent that I have invented method for forming thermoplastic seals which is particularly advantageous for forming seals from Teflon which has heretofore been very difficult to form by conventional molding or other forming techniques. My invention is also useful for forming other thermoplastic materials in quantities so small as not to justify the cost of dies for injection molding.

While I have described certain presently preferred embodiments of my invention, it is to be understood that it may be otherwise variously embodied within the scope of the appended claims.

I claim:

1. The method of making thermoplastic seals which comprises
   (A) rotating a hollow cylinder of thermoplastic material about its central longitudinal axis, and while rotating the cylinder,
   (B) making a cut into the inner cylindrical surface of the cylinder,
      (1) said cut being spaced from one end of the cylinder a distance equal to the thickness of a portion of the seal,
      (2) the depth of the cut being equal to the length of said seal portion, and
   (C) making a second cut through the cylinder to cut a flat ring from the cylinder, said second cut being spaced from the first cut a distance equal to the thickness of a second portion of the seal, (D) mounting the ring for rotation about its central axis, and (E) while rotating the ring pressing a forming tool against the portion of the ring having the first cut, said tool having a contoured surface which engages the edge of the cut portion of the ring to curve the portions of the ring on each side of the first cut away from each other.

2. The method of making thermoplastic seals which comprises (A) rotating a hollow cylinder of thermoplastic material about its central longitudinal axis, and while rotating the cylinder, (B) making radially extending cuts into inner and outer cylindrical surfaces of the cylinder, (1) said cuts being in the same plane.

(2) spaced from an end of the cylinder a distance equal to the thickness of the seal, and (3) of such depth as to leave a flat uncut annulus on the end of the cylinder, (C) pressing forming tools against the portions of the cylinder between the cuts and the end of the cylinder to curve them away from the cylinder and towards each other, and (D) cutting the flat annulus from the cylinder.

References Cited by the Examiner

UNITED STATES PATENTS

| | | | |
|---|---|---|---|
| 979,744 | 12/10 | Burke. | |
| 1,122,280 | 12/14 | Kempshall. | |
| 2,076,079 | 4/37 | Gammeter | 18—56 |
| 2,235,981 | 3/41 | Coe et al. | 18—56 |
| 2,379,584 | 7/45 | Litton | 82—47 |
| 2,425,390 | 8/47 | Palmer et al. | 264—153 |
| 2,724,884 | 11/55 | Jones. | |
| 2,781,552 | 2/57 | Gray | 264—158 |
| 2,823,418 | 2/58 | Fritts | 18—19 |
| 2,959,819 | 11/60 | Potter. | |
| 3,086,246 | 4/63 | Stone. | |
| 3,089,190 | 5/63 | Branham | 18—19 |

ROBERT F. WHITE, *Primary Examiner.*

ALEXANDER H. BRODMERKEL, *Examiner.*